B. A. WESTERLING & A. P. HEDBERG.
STONE CUTTING MACHINE.
APPLICATION FILED MAR. 10, 1911.
1,193,097.
Patented Aug. 1, 1916.
2 SHEETS—SHEET 1.
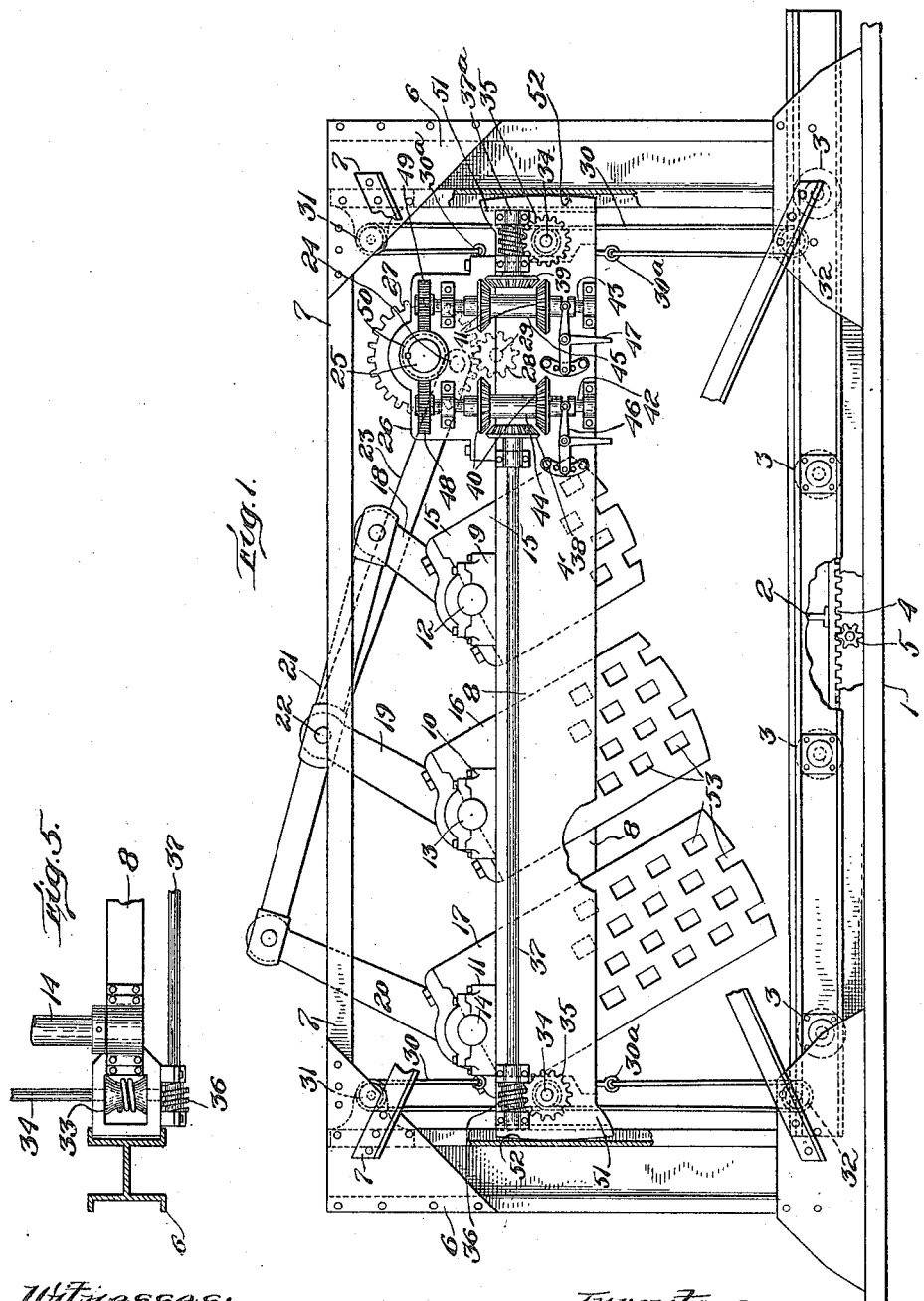

B. A. WESTERLING & A. P. HEDBERG.
STONE CUTTING MACHINE.
APPLICATION FILED MAR. 10, 1911.
1,193,097.
Patented Aug. 1, 1916.
2 SHEETS—SHEET 2.
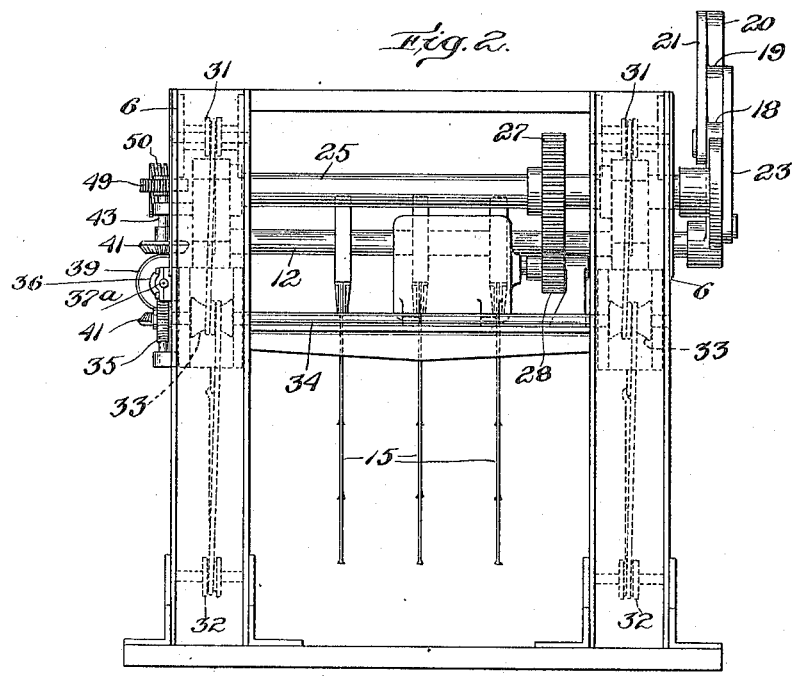
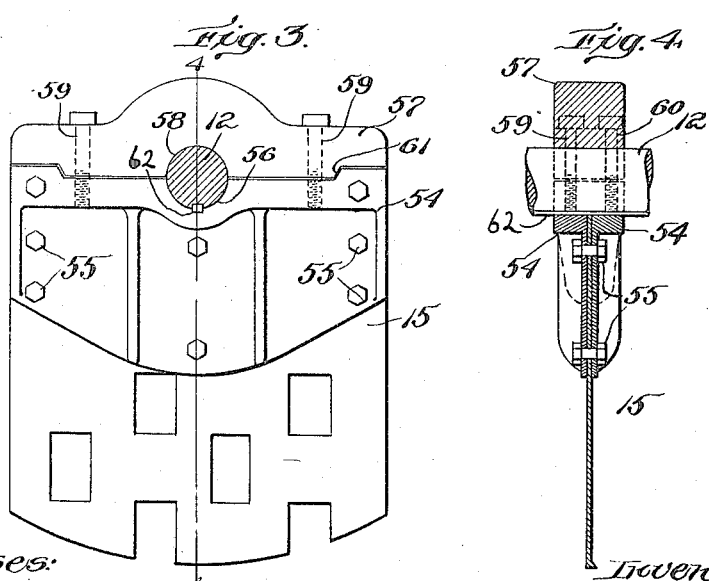

UNITED STATES PATENT OFFICE.

BERNARD A. WESTERLING, OF HOPKINTON, AND AUGUST P. HEDBERG, OF MILFORD, MASSACHUSETTS.

STONE-CUTTING MACHINE.

1,193,097. Specification of Letters Patent. Patented Aug. 1, 1916.

Application filed March 10, 1911. Serial No. 613,585.

*To all whom it may concern:*

Be it known that we, BERNARD A. WESTERLING and AUGUST P. HEDBERG, citizens of the United States, residing at Hopkinton and Milford, respectively, in the State of Massachusetts, have invented an Improvement in Stone-Cutting Machines, of which the following description, in connection with the accompanying drawings, is a specification, like letters on the drawings representing like parts.

This invention relates to stone cutting machines and while it has other and more general fields of usefulness is especially designed for use in connection with the type of stone cutting machine set forth and claimed in our Patent No. 1,031,756 issued July 9, 1912. This type of machine shown in similar form in said prior application and in the present cases comprises a movable work table for holding the stone to be cut, and adjustably mounted thereover, a tool support carrying a plurality of oscillatory shafts, each having a set of blades for operating on the stone, such blades being arranged so that they form series in edgewise alinement from front to rear of the machine on the successive shafts. The several series of blades are held in forwardly inclined position to be actuated by a common operating device, and the successive sets of blades on the respective shafts from front to rear of the machine are of progressively increasing length so that when a stone thick or high enough to afford a full working path for all the blades is presented, each set will have approximately the same amount of work to perform. In said prior application the tool support is simultaneously and equally adjusted at its respective ends so as to bring the blades into proper operative position for different sizes of stone to be cut. In practice the above arrangement is satisfactory where, as stated the stone to be worked upon is of sufficient height or thickness to afford a full working path for all the blades; where stone of less size is to be cut, however, the forward or initial set of blades and perhaps the next set will swing idly for part or all of their movement on account of the stone not extending up far enough to be engaged thereby.

The present invention is designed to provide a construction of tool support and adjusting means therefor whereby it can be tilted to bring its ends in different vertical positions so that the forward blades have their operative edges brought more nearly into horizontal alinement with the rearward blades so that as stone of less thickness is to be cut all the blades may still find a full working path therein.

A further feature of our invention resides in providing a tilting tool support having means at its ends for maintaining it at all times in bracing relation or bearing relation with the guiding uprights, irrespective of whether the tool support is horizontal or tilted to an angular position. This feature provides strong resistance to the tool thrusts and makes the machine more stable, rigid, durable and accurate.

The invention further provides an improved form of mounting of the blades on the driving shafts therefor, which form of mounting or tool holder is of especial importance, and which enables us to shift or change the blades without disturbing the alinement or other adjustments of the holder.

It is a further important feature of the machine that means are provided whereby the sawing blade may be easily, quickly and readily shifted laterally, to make an additional cut or a plurality of cuts in exactly parallel relation, and without shifting the angular, vertical, or horizontal positions of the apparatus.

The above and other detail features of invention will be fully understood from the following description in connection with the accompanying drawings and thereafter pointed out in the appended claims.

Referring to the drawings: Figure 1 is a side elevation of a stone cutting machine constructed in accordance with our invention; Fig. 1ª is a view in side elevation, largely diagrammatic, showing the construction and operation of the tool support; Fig. 2 is an end view thereof; Fig. 3 is a detail side elevation showing the manner of blade mounting; and Fig. 4 is a vertical section on line 4—4 of Fig. 3.

Upon a suitable base 1 a car or table 2 for supporting and feeding the stone is mounted as on rollers 3. This car may be actuated in any preferred manner as by a rack 4 fixed thereto and engaged by a pinion 5 on a suitable driving shaft. Columns 6 extend vertically upward in fixed relation to said base, these being suitably interconnected and braced as by tie bars and struts 7. The tool supporting platform 8 is fitted to slide between guideways therefor in the columns 6 and has spaced apart bearings 9, 10, 11, for a series of shafts 12, 13, 14 to which are clamped, as later described, the respective sets of cutting blades 15, 16, 17, each set being shown in Fig. 2 as consisting of three blades, although obviously any suitable number may be employed as likewise any desired number of series of blades from front to rear of the machine. As shown the blades 15 at the front of the machine are shortest while the succeeding sets 16, 17 are of progressively increasing length, the set 17 extending downward when in vertical position substantially to the car platform. The shafts 12, 13, 14 are connected for simultaneous oscillation by crank arms 18, 19, 20 shown as approximately proportional in length to the blades carried by their respective shafts. These arms have pivotally connected to their outer ends a connecting link 21 which in turn has pivotally engaged therewith at 22 a pitman 23 connected to a crank pin 24 on a driver shaft 25. The shaft 25 is suitably journaled in bearings 26 on a tool support and may be driven in any suitable manner as by a gear 27 and pinion 28 from a shaft 29 which may have a prime mover connected therewith.

The tool supporting platform 8 is supported at its ends for vertical adjustment by flexible means which may be steel bands or cables 30 secured thereto from above and beneath in any suitable manner as by eyes 30ª passing around upper pulleys 31 journaled near the top of the framing, and lower pulley 32 likewise journaled near the bottom thereof. These bands or cables are engaged around sheaves 33 on shafts 34 journaled in the tool supporting platform adjacent its respective ends. Any suitable means may be employed to keep the cables from slipping on these sheaves; as shown this is accomplished by giving them several turns around the sheaves. The shafts 34 have fixed thereon worm wheels 35 which are engaged by worms 36 on the ends of axially alined shafts 37 and 37ª suitably journaled in the tool supporting framework; as shown the shaft 37 extends through the major part of the length of the tool support, while the shaft 37ª is relatively short. The shafts 37 and 37ª have fixed thereon at their inner ends oppositely facing bevel pinions 38, 39 respectively, these being spaced apart far enough to receive the driving gearing therefor to be now described. The pinions 38, 39 are engageable by either of the pinions of oppositely facing pairs 40, 41 slidable on shafts 42, 43, vertically mounted in the tool supporting framework, the pairs of pinions 40, 41, carried thereby being spaced apart so that only one at a time can be engaged with the driven pinions 38, 39, and so that both pinions of the pairs may be disengaged at will. To effect shipping of the pinion carrying spools 44, 45, extensions thereof having annular grooves are engaged by suitable shipper levers 46, 47 pivoted to the tool supporting framework and extending to a position for convenient manipulation. The upper ends of shafts 42, 43 have fixed thereon worm wheels 48, 49, in position to be engaged by the worm 50 on a shaft 25 to receive driving impulse therefrom. It is thus apparent that by suitable manipulation of the shipper levers 46, 47, driving impulse may be imparted to shafts 37, 37ª so as to cause the sheaves 33 at both ends to be turned in the same direction at the same speed thus causing the tool supporting framework to be raised or lowered in parallelism with the work support; by other manipulation of said shipper levers the sheaves at either end may be caused to turn while those at the other end are stationary thus tilting the tool supporting framework from one end. By still further manipulation of said shipper levers, the sheaves at the respective ends may be caused to turn in opposite directions thus causing either end of the tool supporting framework to be raised as the other is lowered. Thus the several cutting blades of the series may be positioned as shown in Fig. 1 so that the forward series are at a considerably higher elevation than the rearward series so that each series will have a cutting path extending downward into the stone to a substantial degree and so that the several series of blades from front to rear will cut entirely through stone of suitable thickness with one passage through the machine. On the other hand when stone of less thickness is to be cut the tool supporting framework may be tilted as before described so as to bring the operative edges of the forward sets of blades more nearly into horizontal alinement with the rearward sets, thus making the lines of cuts of the blades more nearly horizontal and thus of course making possible a correspondingly more rapid feed of the work on its car support. It is likewise possible when stones of unusual or excessive thickness are to be cut to tilt the tool supporting platform in the opposite direction so as to elevate the forward blades thus making the several cuts more nearly vertical and enabling the total cuts made by all the blades to extend to a greater height from the car platform. As stated the tool supporting platform 8 has its ends engaging guideways therefor in the upright 6. To insure a better bearing abutment of the platform ends against the upright 6 said ends may be provided with laterally extending shoes 51 and the bearing ends of the platform including said shoes formed on an arc of curvature corresponding to the tilting movement of the framework 8 as shown at 52.

By having the ends of the tool support 8 curved on the arc of its tilting movement, i. e. as shown, on a radius from the end uprights 6 to the middle of the support, and either of sufficient width or having lateral extensions, as at 51 (preferably projecting in opposite directions at the respective ends of the support), the result is that when one end of the tool support is lowered or raised with relation to the other end, neither end is thereby swung away from either of the uprights so as to get out of bearing engagement or proper abutting relation with said uprights. On the contrary, the tool support continues in strong bracing position between and in relation to both uprights, irrespective of whether it is in horizontal position as shown in full lines in Fig. 1, or is in a tilted position. The curved ends constitute one preferred means for maintaining the end bearing and bracing relation of the tool support of the uprights. This is one of the principal features of importance of our invention and is intended to be herein claimed broadly.

The blades 15, 16 and 17 are formed with successive sets of apertures 53 to receive steel shot or like abrasive material, the several sets of apertures in each blade becoming successively operative for this purpose as the blades wear away. Our novel means for firmly and reliably securing the blades to the several shafts 12, 13, and 14 comprise ribbed plates 54 adapted to be clamped to the blades from either side as by bolts 55, these plates having a partial bearing 56 for the shaft. A cap 57 having a complementary clamping portion 58 to engage around the shaft is formed of a width to coöperate with both plates 54 and is clamped to each plate separately by bolts 59, 60. The cap 57 may be formed to interfit with the plates 54 as shown at 61. The blades may thus be securely gripped to the plates 54 and these plates gripped to each other by the bolts 55, while these plates and the cap 57 are mutually drawn into secure binding engagement with the shaft by the bolts 59, 60.

Referring to Figs. 3 and 4 it will be noted that a key or spline 62 is provided, whereby the cap 57 and plates 54 are held positively with relation to the shaft 12, so that as said shaft is rocked or oscillated the tool holder and the sawing blade is similarly rocked. This key 62 is preferably made to extend throughout the entire length of the shaft 12, so that the tool holder may be shifted or adjusted longitudinally of the shaft 12 without danger of changing its angular position thereon, by simply loosening the bolts 59 and sliding the tool holder to the new position desired. A similar arrangement is shown on shafts 13 and 14. This construction enables a plurality of exactly parallel cuts to be formed by the machine in a speedy and efficient manner, without the necessity of any additional adjustment, excepting the lateral movement mentioned. Another important advantage of the tool or blade holder consists in the arrangement of the plates 54 and bolts 55, whereby the bolts 55 may be loosened, an old blade removed and a new one fitted without disturbing the adjustments of the machine or the position of either the tool holder or its supporting shaft. In a heavy apparatus, such as is required in the art of stone cutting, these features are of great advantage and their importance will be readily appreciated.

It is thus apparent that the angularly adjustable tool supporting platform with the means for tilting the same to any desired angle as set forth extends the field of usefulness of this type of stone cutting machine to a material extent, enabling the machine to be economically operated in cutting stone of widely varying thickness, each blade being provided with a full working path which may be more nearly horizontal with a correspondingly accelerated work feed for stone of less thickness or more nearly vertical for operating on thicker work. Further the arrangement of gearing described provides means whereby any degree of tilting found desirable at any particular time can be very quickly accomplished by making the proper power drive connection through adjustment of the shipper levers 46, 47.

Having described our invention, what we claim as new and desire to secure by Letters Patent is as follows:

1. In a stone cutting machine, opposite uprights, a tool support extending from one upright to the other and braced thereby, said tool support having a tilting movement to varying angles with relation to the work and having its opposite ends curved to coöperate with the uprights to maintain continuous engagement with the respective uprights irrespective of the angle to which the support is tilted.

2. In a stone cutting machine, opposite uprights, a tool support extending from one upright to the other and braced thereby, said tool support having provision for a tilting movement to varying angles with relation to the work and having its opposite ends curved and provided with oppositely projecting extensions of said curved ends to maintain continuous engagement with the respective uprights irrespective of the angle to which the support is tilted.

3. A stone cutting machine comprising fixed, spaced apart uprights, a work support, a tool support extending in the same general direction as said work support and mounted on said uprights, a series of operatively movable tools mounted in edgewise alinement on said tool support of progressively greater length from front to rear of the machine so as to present an extended diagonal cutting line to the work, and means for relatively adjusting said tool support and said work support to bring a line drawn through the operative portions of the several tools to different angles relative to the work support.

4. A stone cutting machine comprising a work support, a tool support mounted for tilting adjustment thereover, a series of operatively movable tools of progressively increasing length from front to rear of the machine so as to present an extended diagonal cutting line to the work mounted on said tool support and means for adjusting both ends of said tool support simultaneously or one end only at will, relative to said work support.

5. A stone cutting machine comprising a work support, a tool support tiltably mounted thereover, a series of oscillatory tools of progressively increasing length from front to rear so as to present an extended diagonal cutting line to the work mounted in edgewise alinement on said tool support, and means for adjusting the respective ends of said tool support individually to different heights above said work support for the purpose stated.

6. A stone cutting machine comprising fixed, spaced apart uprights, a work support, a tool support tiltably mounted on said uprights carrying a series of oscillatory cutting tools of different lengths in edgewise alinement so as to present an extended diagonal cutting line to the work, and means for flexibly supporting said tool support whereby its ends may be adjusted to different elevations for the purpose stated.

7. A stone cutting machine comprising fixed, spaced apart uprights, a work support, a tool support tiltably mounted between said uprights carrying a series of tools of different lengths in edgewise alinement, flexible means having a vertical mounting on said uprights, and means carried by said tool support for engaging said flexible means to bring the respective ends of said tool support to different elevations relative to said work support for the purpose stated.

8. A stone cutting machine comprising a work support, a tool support mounted for tilting adjustment thereover having a series of oscillatory tools of different lengths mounted in edgewise alinement, flexible means vertically mounted at the ends of said tool support, and power connections carried by said tool support for engaging said flexible means, said connections being constructed to move either end of said tool support without moving the other, or to move both ends simultaneously at will.

9. A stone cutting machine comprising a base, a work support thereon, uprights extending from said base, a tool support tiltably guided between said uprights having a series of operatively movable tools of progressively increasing length, means for adjusting the ends of said tool support simultaneously and means for individually adjusting said ends differentially relative to said work support.

10. A stone cutting machine comprising a work support, a tool support tiltably mounted thereover having a series of operatively movable tools of progressively increasing size, adjustable supports for the respective ends of said tool support, driving means on said tool support, separate connections therefrom to each end of the tool support and means for controlling said connections for operation simultaneously or individually and in the same or opposite directions.

11. In a stone cutting machine, opposite uprights, a tool support extending from one upright to the other and braced thereby, said tool support having a tilting movement to varying angles with relation to the work and having its opposite ends curved to coöperate with the uprights to maintain continuous engagement with the respective uprights irrespective of the angle to which the support is tilted, in combination with means on said tool support to hold sawing blades in adjusted angular position with relation to the work, said means having provision for longitudinal adjustment of said blades while held in said angular position.

In testimony whereof, we have signed our names to this specification, in the presence of two subscribing witnesses.

BERNARD A. WESTERLING.
AUGUST P. HEDBERG.

Witnesses:
JOSEPH B. McEWEN,
FRANK E. MANN.

Copies of this patent may be obtained for five cents each, by addressing the "Commissioner of Patents, Washington, D. C."